US010554735B2

(12) United States Patent
Sarda et al.

(10) Patent No.: US 10,554,735 B2
(45) Date of Patent: Feb. 4, 2020

(54) TARGETED DELIVERY OF DOWNLOAD FOR CONNECTED DEVICES

(71) Applicant: ARRIS Enterprises LLC, Suwanee, GA (US)

(72) Inventors: Harin D. Sarda, Bangalore (IN); Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 182 days.

(21) Appl. No.: 15/680,600

(22) Filed: Aug. 18, 2017

(65) Prior Publication Data

US 2019/0058757 A1   Feb. 21, 2019

(51) Int. Cl.
 *H04L 29/08* (2006.01)
 *H04L 12/911* (2013.01)
(52) U.S. Cl.
 CPC .............. *H04L 67/10* (2013.01); *H04L 47/70* (2013.01)
(58) Field of Classification Search
 CPC ............................ H04L 67/10; H04L 63/101
 USPC ........................................................ 709/219
 See application file for complete search history.

(56) References Cited

U.S. PATENT DOCUMENTS

| 7,716,662 | B2 | 5/2010 | Seiden |  |
|---|---|---|---|---|
| 8,327,348 | B2 | 12/2012 | Seiden |  |
| 8,892,720 | B2 | 11/2014 | Diaz |  |
| 8,925,022 | B2 | 12/2014 | Carbunar et al. |  |
| 2008/0155613 | A1* | 6/2008 | Benya | H04N 7/17318 725/89 |
| 2009/0254966 | A1* | 10/2009 | Josephs | H04N 7/17318 725/140 |
| 2010/0058400 | A1* | 3/2010 | Nicas | H04N 7/165 725/74 |
| 2016/0286457 | A1* | 9/2016 | O'hare | G01C 21/26 |
| 2017/0064384 | A1* | 3/2017 | Sahoo | H04N 21/441 |

* cited by examiner

*Primary Examiner* — Glenford J Madamba
(74) *Attorney, Agent, or Firm* — Bart A. Perkins

(57) ABSTRACT

Methods, systems, and computer readable media can be operable to facilitate a selection of a device for receiving a download associated with one or more other devices. When a download is targeted to a plurality of devices, an individual device may be selected from the plurality of devices, and the selected device may retrieve the download. After retrieving the download, the selected device may share the download with the rest of the plurality of devices. The individual device may be selected based upon status information associated with each of the plurality of devices, and the selected device may be a device that is free or relatively less busy than the other devices.

17 Claims, 5 Drawing Sheets

TARGETED DELIVERY OF DOWNLOAD FOR CONNECTED DEVICES

TECHNICAL FIELD

This disclosure relates to the targeted delivery of a download for connected devices.

BACKGROUND

One or more CPE (customer premise equipment) devices such as set-top boxes (STB), multimedia gateways, multimedia clients, televisions, and others may be installed within a subscriber premise. For example, a subscriber premise may include one or more CPE devices in one or more rooms of the subscriber premise. Each of the CPE devices within a subscriber premise may be connected to each other via an in-home network technology such as MoCA (multimedia over coax alliance), IP (Internet protocol), Ethernet, and others, and each of the CPE devices within the subscriber premise may be connected to one or more upstream networks such as a MSO (multiple-systems operator) network.

CPE devices may periodically receive updates, data objects, or other communications from a MSO server. For example, each CPE device may download an update, code object (e.g., firmware, application, data objects, etc.) from a MSO server. A download may be delivered to a CPE device through a pull or push based mechanism (e.g., gateway image loader (GIL), DCT based code download, DSM-CC, unicast, multicast, or other standard-based download). A download may targeted to each CPE device within a subscriber premise individually.

However, the download process utilized by MSOs has various inefficiencies. For example, a MSO generally spins/carousels code and data object(s) throughout an associated network which consumes the bandwidth within the network and the bandwidth within an in-home network. Further all of the CPE devices within a subscriber premise are forced to process download messages. If a download is targeted via in-band QAM (quadrature amplitude modulation) channel, then utilization of STB resources and QAM channel is increased. Also, a STB may suffer an outage when tuning to a QAM channel in an effort to download code and data objects. Moreover, a MSO may be unable to determine whether all CPE devices within a subscriber premise have successfully received a download. For example, when a CPE device is powered down or otherwise absent from a network, a MSO may not receive an acknowledgement of a successful download by the CPE device. In some instances, one or more CPE devices within a subscriber device may successfully receive a download while one or more other CPE devices within the subscriber premise may fail to receive the download, and in these instances, the CPE devices within the subscriber premise may face inter-operability issues and/or may fail to provide certain functions or features. With each CPE device within a subscriber premise retrieving a download through a unicast or multicast session, bandwidth utilization may be increased when the download is individually delivered to each of the CPE devices.

Therefore, a need exists for improving methods and systems for delivering a download to multiple CPE devices within a subscriber premise.

BRIEF DESCRIPTION OF THE DRAWINGS

Like reference numbers and designations in the various drawings indicate like elements.

DETAILED DESCRIPTION

It is desirable to improve upon methods and systems for delivering downloads to multiple devices within a subscriber premise. Methods, systems, and computer readable media can be operable to facilitate a selection of a device for receiving a download associated with one or more other devices. When a download is targeted to a plurality of devices, an individual device may be selected from the plurality of devices, and the selected device may retrieve the download. After retrieving the download, the selected device may share the download with the rest of the plurality of devices. The individual device may be selected based upon status information associated with each of the plurality of devices, and the selected device may be a device that is free or relatively less busy than the other devices.

Figure 1:
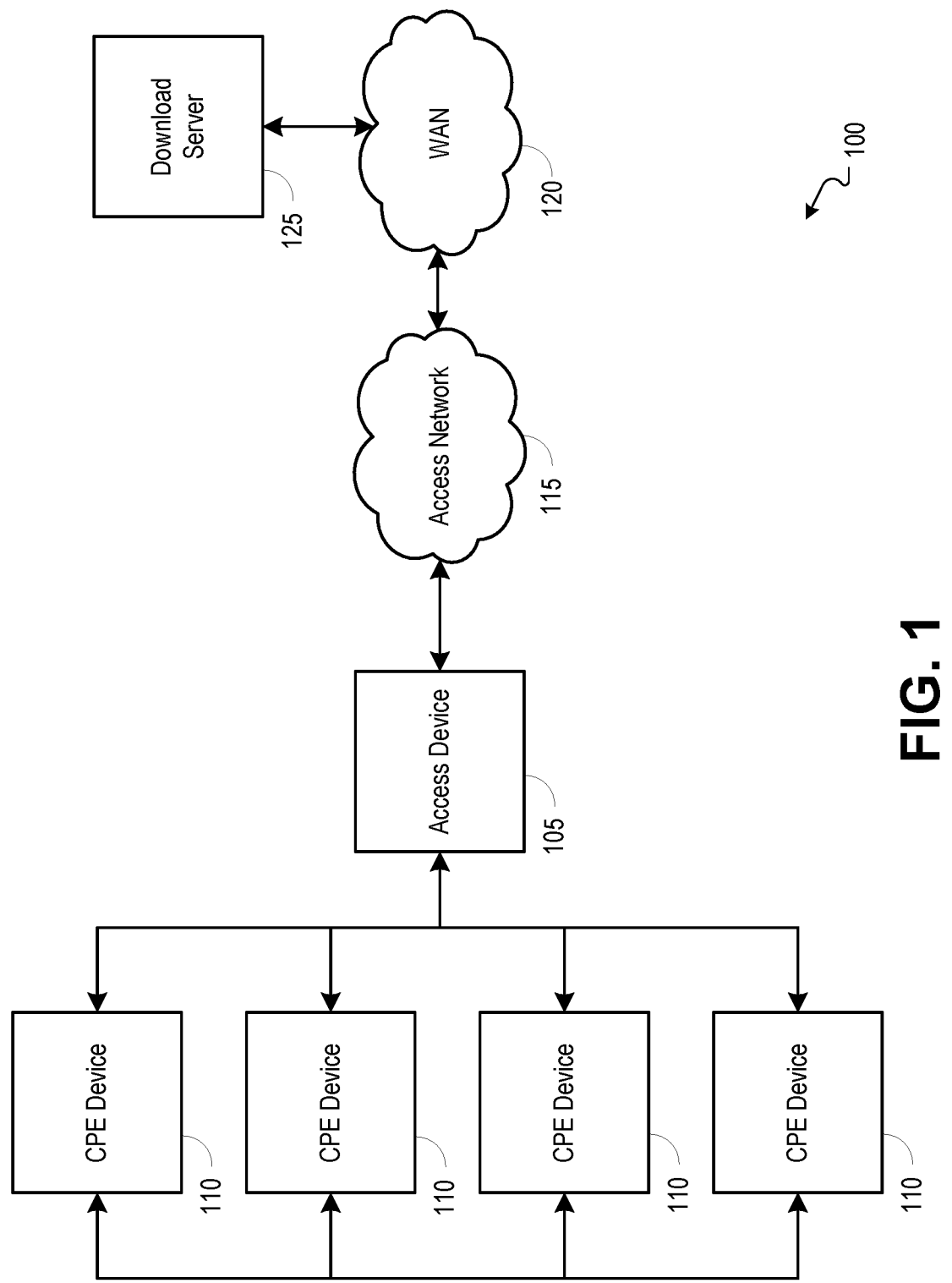
FIG. 1 is a block diagram illustrating an example network environment operable to facilitate a selection of a device for receiving a download associated with one or more other devices.

FIG. 1 is a block diagram illustrating an example network environment 100 operable to facilitate a selection of a device for receiving a download associated with one or more other devices. In embodiments, an access device 105 may provide an interface between an upstream network and one or more customer premise equipment (CPE) devices 110. An access device 105 may include a modem, a router, an access point, a wireless extender, NAT (network address translation) device, a splitter, or any other device configured to provide an interface between one or more CPE devices 110 and an upstream network. A CPE device 110 may receive and/or deliver one or more services (e.g., video, data, voice, security, and/or other service(s)) to a subscriber. For example, a CPE device 110 may include a set-top box (STB), multimedia gateway device, IP (Internet protocol) client device, modem, router, wireless extender, tablet, computer, mobile device, Internet of things (IoT) device, and/or any other device configured to receive and/or deliver a service to a subscriber.

In embodiments, the CPE device(s) 110 may receive the one or more services and may transmit and receive other communications to and from one or more upstream network components through an access network 115 and a wide-area network (WAN) 120. The access network 115 may include any of a variety of communication links between the CPE device(s) 110 and a WAN 120, such as a hybrid-fiber coaxial (HFC) network, phone line(s) connected to a digital subscriber line access multiplexer (DSLAM), wireless communication network, and others.

In embodiments, a CPE device 110 may receive downloads including updates (e.g., software and firmware updates), firmware or application code and/or data objects, and/or other objects or communications remotely from an upstream server. For example, a download server 125 may generate and transmit software and firmware code and/or data object downloads through one or more networks to one or more CPE devices 110. The download server 125 may include a code download server, an electronic program guide (EPG) data server, a video hub office server, or any other server configured to generate and transmit an update file to a CPE device 110.

In embodiments, a download may be targeted to multiple CPE devices 110 within a subscriber premise, and the multiple CPE devices 110 may be of the same type (e.g., same hardware, model, etc.) or of different types (e.g., hardware, model, etc.). From the multiple CPE devices 110 targeted for a download, a single CPE device 110 which is free or relatively less busy or has more available computing resources at a certain time instance than the other CPE devices 110 may be identified. The single CPE device 110 may be identified based upon status information associated with each of the multiple CPE devices 110, and the status information may include an identification of one or more tasks being carried out by each respective CPE device 110 and the computing resources available to each respective CPE device 110. For in-band code download, a CPE device 110 which has a free tuner may be identified, and the identified CPE device 110 can take the responsibility of downloading code and data objects for itself as well as for other CPE devices 110, so that tuners of the other CPE devices 110 are not disturbed and any CPE devices 110 which do not have an in-band QAM (quadrature amplitude modulation) tuner can also take advantage of an in-band code download feature.

In embodiments, the identified CPE device 110 may be selected to receive the download for each of the multiple CPE devices 110, and the identified CPE device 110 may share the download with the other CPE devices 110. The identified CPE device 110 may notify the other CPE devices 110 that the download will be received by the identified CPE device 110, and the identified CPE device 110 may instruct the other CPE devices 110 not to initiate a retrieval of the download. With only a single CPE device 110 retrieving the download, a reduction in the utilization of in-home and network bandwidth may be realized.

When the download is completed by the identified CPE device 110, the other CPE devices 110 may be notified so that the other CPE devices 110 may retrieve the download from the identified CPE device 110 or from another source. For example, the other CPE devices 110 may retrieve the download from the identified CPE device 110 through any of various transfer protocols or mechanisms (e.g., FTP (file transfer protocol), TFTP (trivial file transfer protocol), HTTP (hypertext transfer protocol), etc.). As another example, the identified CPE device 110 may deliver the download to the other CPE devices 110 utilizing the same or a similar download protocol that was used by the identified CPE device 110 in receiving the download (e.g., GIL (gateway image loader), DCT, etc.). When the download is completed by the identified CPE device 110, the identified CPE device 110 may operate as an in-home download server for the other CPE devices 110.

In embodiments, the identified CPE device 110 may output a report that includes an acknowledgement of a successful retrieval of the download by the identified CPE device 110 as well as an acknowledgement of a successful retrieval of the download by each of the one or more other CPE devices 110. The report may be output, for example, to the download server 125 or other application or server within an associated MSO (multiple systems operator) network.

Figure 2:
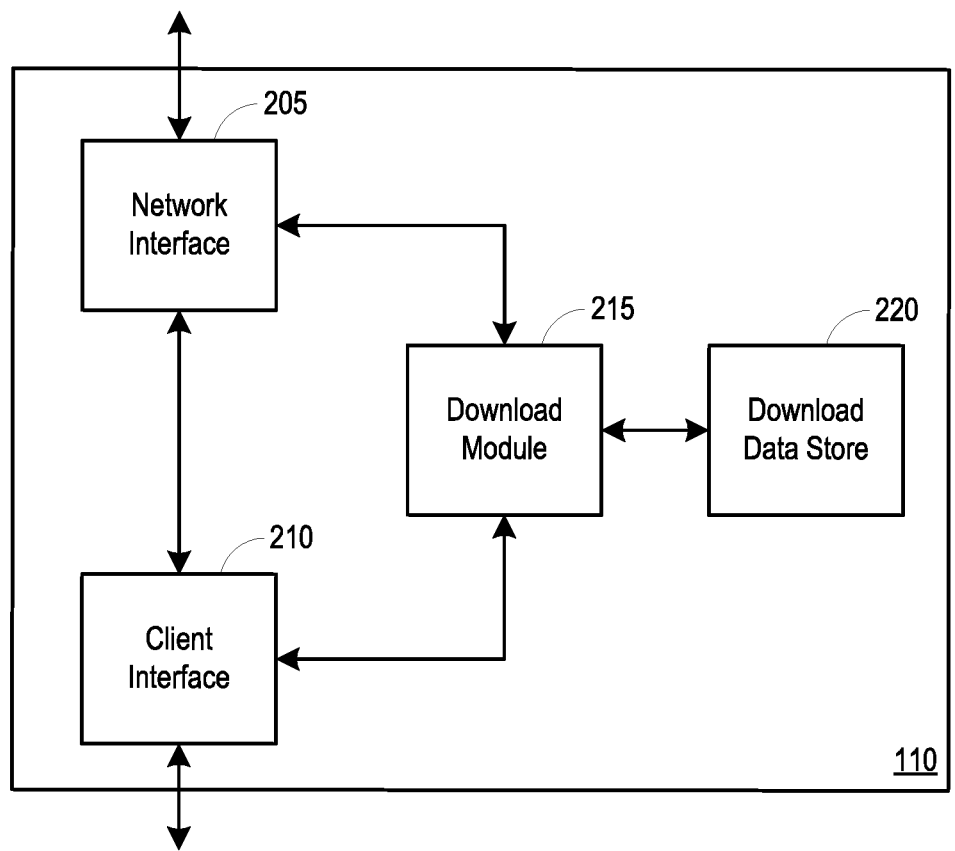
FIG. 2 is a block diagram illustrating an example CPE device operable to facilitate a selection of a device for receiving a download associated with one or more other devices.

FIG. 2 is a block diagram illustrating an example CPE device 110 operable to facilitate a selection of a device for receiving a download associated with one or more other devices. In embodiments, the CPE device 110 may include a network interface 205, a client interface 210, a download module 215, and a download data store 220. The CPE device 110 may be a set-top box (STB), multimedia gateway device, IP (Internet protocol) client device, modem, router, wireless extender, tablet, computer, mobile device, Internet of things (IoT) device, and/or any other device configured to receive and/or deliver a service to a subscriber.

In embodiments, a CPE device 110 may receive downloads including updates (e.g., software and firmware updates), firmware or application code and/or data objects, and/or other objects or communications remotely from an upstream server (e.g., download server 125 of FIG. 1). The downloads may be received through the network interface 205.

In embodiments, a download may be targeted to multiple CPE devices 110 within a subscriber premise. A download trigger may be output to each of the multiple CPE devices 110 when a download is available for the CPE devices 110. When a download trigger is received, status information associated with each of the CPE devices 110 (e.g., an identification of one or more tasks being carried out by each respective CPE device 110 and the computing resources available to each respective CPE device 110) may be retrieved, and from the multiple CPE devices 110 targeted for a download, a single CPE device 110 which is free or relatively less busy or has more available computing resources at a certain time instance than the other CPE devices 110 may be identified. The single CPE device 110 may be identified based upon status information associated with each of the multiple CPE devices 110. For in-band code download, a CPE device 110 which has a free tuner may be identified, and the identified CPE device 110 can take the responsibility of downloading code and data objects for itself as well as for other CPE devices 110, so that tuners of the other CPE devices 110 are not disturbed and any CPE devices 110 which do not have an in-band QAM (quadrature amplitude modulation) tuner can also take advantage of an in-band code download feature.

In embodiments, when a download trigger is received by one or more CPE devices 110, a CPE device 110 may be assigned the role of retrieving status information from each respective one of the plurality of CPE devices 110 that are targeted for receiving the download and selecting a CPE device 110 to retrieve the download. For example, the CPE device 110 selected to assume the role of retrieving status information may be based upon default settings (i.e., a master device such as a multimedia gateway or master node may be configured to assume the role of retrieving status information from other CPE devices 110 and choosing a CPE device 110 to retrieve a download), may be based upon timing at which the download trigger is received (e.g., the first CPE device 110 to receive the download trigger may assume the role of retrieving status information from other CPE devices 110 and choosing a CPE device 110 to retrieve a download), or may be based upon the availability of resources at one or more CPE devices 110 (e.g., a CPE device 110 having the capacity or available resources for retrieving status information may assume the role of retrieving status information from other CPE devices 110 and choosing a CPE device 110 to retrieve a download).

In embodiments, the identified CPE device 110 may be selected to receive the download for each of the multiple CPE devices 110, and the identified CPE device 110 may share the download with the other CPE devices 110. A download module 215 may initiate a retrieval of the download for the identified CPE device 110 and the other CPE devices 110, and the download may be stored at the download data store 220. The download module 215 of the identified CPE device 110 may notify the other CPE devices 110 that the download will be received by the identified CPE device 110, and the download module 215 may instruct the other CPE devices 110 not to initiate a retrieval of the download. The download module 215 may communicate with the other CPE devices 110 through the client interface 210.

When the download is completed by the download module 215 of the identified CPE device 110, the download module 215 may notify the other CPE devices 110 so that the other CPE devices 110 may retrieve the download from the identified CPE device 110 or from another source. For example, the other CPE devices 110 (e.g., download modules 215 of the other CPE devices 110) may retrieve the download from the identified CPE device 110 through any of various transfer protocols or mechanisms (e.g., FTP (file transfer protocol), TFTP (trivial file transfer protocol), HTTP (hypertext transfer protocol), etc.). As another example, the download module 215 of the identified CPE device 110 may deliver the download to the other CPE devices 110 utilizing the same or a similar download protocol that was used by the identified CPE device 110 in receiving the download (e.g., GIL (gateway image loader), DCT, etc.). When the download is completed by the download module 215 of the identified CPE device 110, the identified CPE device 110 may operate as an in-home download server for the other CPE devices 110 by storing the download at the download data store 220.

In embodiments, the download module 215 of the identified CPE device 110 may output a report that includes an acknowledgement of a successful retrieval of the download by the download module 215 as well as an acknowledgement of a successful retrieval of the download by each of the one or more other CPE devices 110. The report may be output, for example, to the download server 125 of FIG. 1 or other application or server within an associated MSO (multiple systems operator) network.

Figure 3:
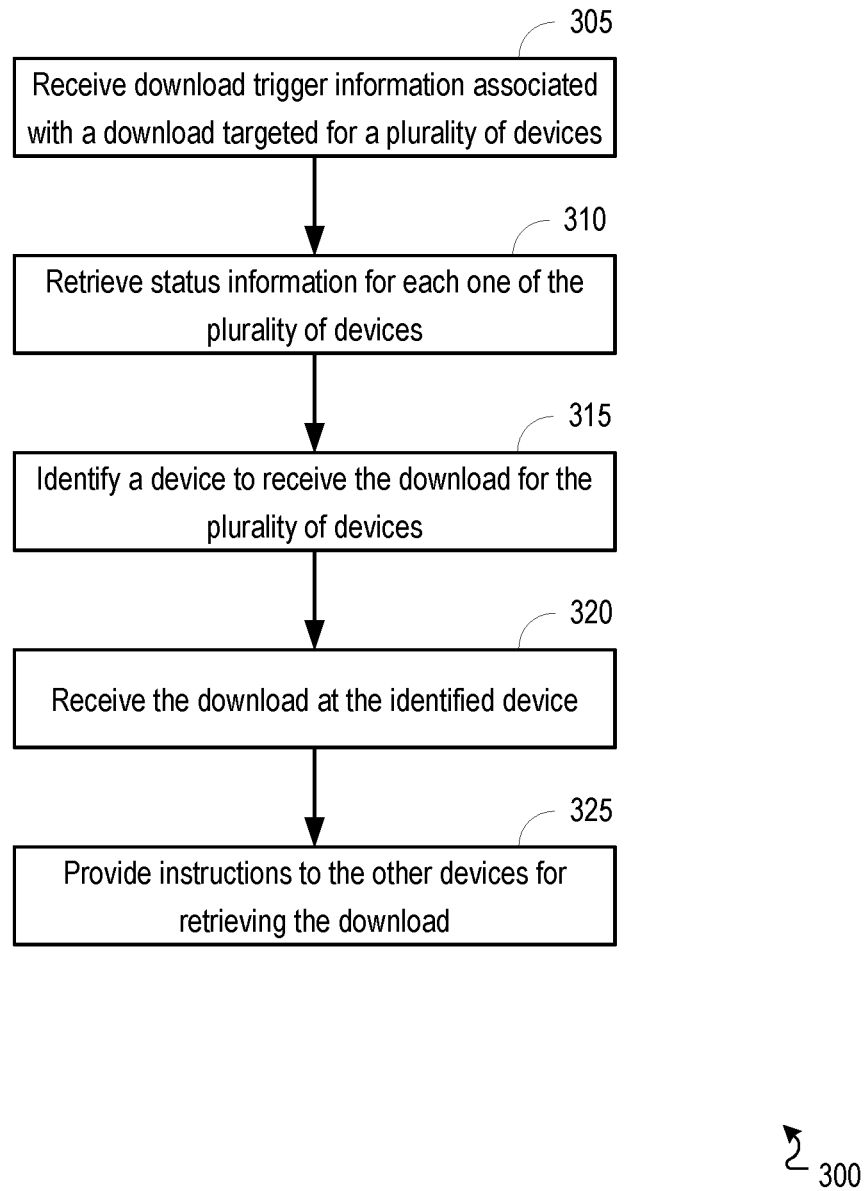
FIG. 3 is a flowchart illustrating an example process operable to facilitate a selection of a device for receiving a download associated with one or more other devices and a forwarding of instructions to the other devices for retrieving the download.

FIG. 3 is a flowchart illustrating an example process 300 operable to facilitate a selection of a device for receiving a download associated with one or more other devices and a forwarding of instructions to the other devices for retrieving the download. The process 300 can begin at 305 when download trigger information associated with a download targeted for a plurality of devices is received. The download trigger information may be received, for example, by a CPE device 110 of FIG. 1 (e.g., by a download module 215 of FIG. 2). In embodiments, the download trigger information may be received by each of the devices targeted for receiving the download, and the download trigger information may notify each of the devices of the availability of the download (e.g., software or firmware updates, firmware or application code and/or data objects, etc.). The download trigger information may be provided by an upstream server (e.g., download server 125 of FIG. 1).

At 310, status information for each respective one of the plurality of devices may be retrieved. The status information may be retrieved, for example, by a CPE device 110 (e.g., by a download module 215), and the status information may be retrieved from each of the devices (e.g., CPE devices 110) targeted for receiving the download. In embodiments, the status information may include an identification of one or more tasks being carried out by each respective CPE device 110 and the computing resources available to each respective CPE device 110. For an in-band code download, the status information may include an identification of the status of one or more tuners associated with each of the CPE devices 110 and/or an identification of the number of tuners available at each of the CPE devices 110 for receiving the in-band code download.

At 315, a device may be identified to receive the download for the plurality of devices. The device may be identified, for example, by the CPE device 110 (e.g., by the download module 215) that retrieves status information from each of the devices targeted for receiving the download. The device may be identified from the plurality of devices that are targeted for receiving the download, and the device may be identified based upon the status information retrieved from each of the devices that are targeted for receiving the download. For example, from the plurality of devices that are targeted for receiving the download, a download module 215 may select a single device (e.g., CPE device 110) which is free or relatively less busy or has more available computing resources at a certain time instance than the other devices. When the download is an in-band code download, the download module 215 may identify a CPE device 110 which has a free tuner.

At 320, the download may be received at the identified device. For example, the identified device (e.g., download module 215 of the identified CPE device 110) may initiate a retrieval of the download from an upstream server (e.g., download server 125 of FIG. 1), and the download may be stored at the identified device (e.g., at a download data store 220 of FIG. 2). When the identified device initiates the retrieval of the download, the identified device may instruct the other devices (e.g., the other CPE devices 110 targeted for receiving the download) not to initiate a retrieval of the download.

At 325, instructions may be provided to the other devices for retrieving the download. For example, when the identified device has successfully received the download, the identified device (e.g., the download module 215 of the identified CPE device 110) may output a notification to each of the other devices (e.g., the other CPE devices 110 targeted for receiving the download), and the notification may include instructions for retrieving the download. In embodiments, the notification may identify a location or source from which the download may be retrieved. For example, the notification may instruct the other CPE devices 110 to retrieve the download from the identified CPE device 110 through any of various transfer protocols or mechanisms (e.g., FTP (file transfer protocol), TFTP (trivial file transfer protocol), HTTP (hypertext transfer protocol), etc.). As another example, the notification may inform the other CPE devices 110 that the identified CPE device 110 will deliver the download to the other CPE devices 110 utilizing the same or a similar download protocol that was used by the identified CPE device 110 in receiving the download (e.g., GIL (gateway image loader), DCT, etc.). It should be understood that the location or source from which the download may be retrieved may be within the identified device (e.g., a download data store 220 of the identified CPE device 110) or may be located at another device or server.

In embodiments, the identified CPE device 110 may output a report that includes an acknowledgement of a successful retrieval of the download by the identified CPE device 110 as well as an acknowledgement of a successful retrieval of the download by each of the one or more other CPE devices 110. The report may be output, for example, to the download server 125 of FIG. 1 or other application or server within an associated MSO (multiple systems operator) network.

Figure 4:
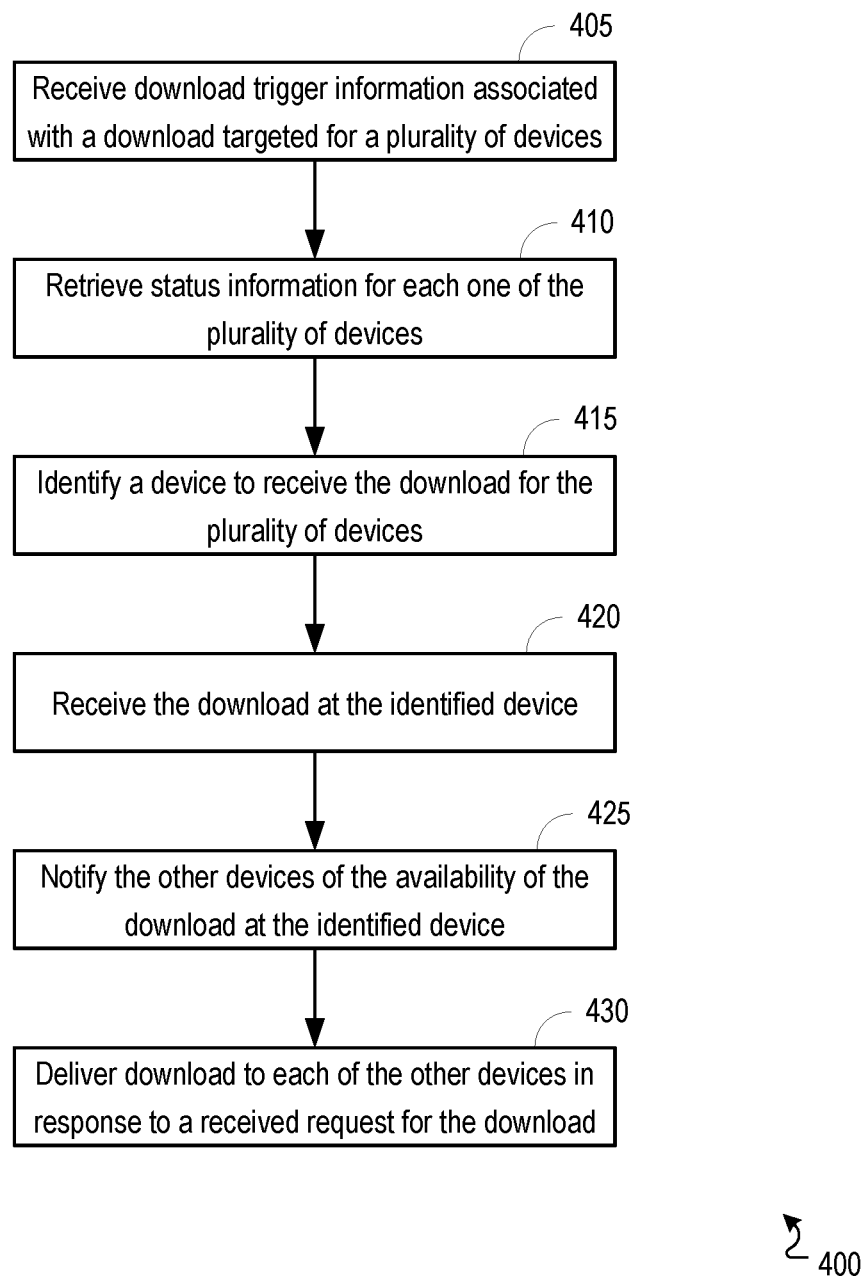
FIG. 4 is a flowchart illustrating an example process operable to facilitate a selection of a device for receiving a download associated with one or more other devices and a delivery of the download from the selected device to the one or more other devices.

FIG. 4 is a flowchart illustrating an example process 400 operable to facilitate a selection of a device for receiving a download associated with one or more other devices and a delivery of the download from the selected device to the one or more other devices. The process 400 can begin at 405 when download trigger information associated with a download targeted for a plurality of devices is received. The download trigger information may be received, for example, by a CPE device 110 of FIG. 1 (e.g., by a download module 215 of FIG. 2). In embodiments, the download trigger information may be received by each of the devices targeted for receiving the download, and the download trigger information may notify each of the devices of the availability of the download (e.g., software or firmware updates, firmware or application code and/or data objects, etc.). The download trigger information may be provided by an upstream server (e.g., download server 125 of FIG. 1).

At 410, status information for each respective one of the plurality of devices may be retrieved. The status information may be retrieved, for example, by a CPE device 110 (e.g., by a download module 215), and the status information may be retrieved from each of the devices (e.g., CPE devices 110) targeted for receiving the download. In embodiments, the status information may include an identification of one or more tasks being carried out by each respective CPE device 110 and the computing resources available to each respective CPE device 110. For an in-band code download, the status information may include an identification of the status of one or more tuners associated with each of the CPE devices 110 and/or an identification of the number of tuners available at each of the CPE devices 110 for receiving the in-band code download.

At 415, a device may be identified to receive the download for the plurality of devices. The device may be identified, for example, by the CPE device 110 (e.g., by the download module 215) that retrieves status information from each of the devices targeted for receiving the download. The device may be identified from the plurality of devices that are targeted for receiving the download, and the device may be identified based upon the status information retrieved from each of the devices that are targeted for receiving the download. For example, from the plurality of devices that are targeted for receiving the download, a download module 215 may select a single device (e.g., CPE device 110) which is free or relatively less busy or has more available computing resources at a certain time instance than the other devices. When the download is an in-band code download, the download module 215 may identify a CPE device 110 which has a free tuner.

At 420, the download may be received at the identified device. For example, the identified device (e.g., download module 215 of the identified CPE device 110) may initiate a retrieval of the download from an upstream server (e.g., download server 125 of FIG. 1), and the download may be stored at the identified device (e.g., at a download data store 220 of FIG. 2). When the identified device initiates the retrieval of the download, the identified device may instruct the other devices (e.g., the other CPE devices 110 targeted for receiving the download) not to initiate a retrieval of the download.

At 425, the other devices may be notified of the availability of the download at the identified device. For example, when the identified device has successfully received the download, the identified device (e.g., the download module 215 of the identified CPE device 110) may output a notification to each of the other devices (e.g., the other CPE devices 110 targeted for receiving the download), and the notification may inform the other devices that the download is available at the identified device. In embodiments, the notification may include instructions for retrieving the download. For example, the notification may identify a location or source from which the download may be retrieved (e.g., from a download data store 220 of the identified CPE device 110), and the notification may instruct the other devices to retrieve the download from the identified CPE device 110 through any of various transfer protocols or mechanisms (e.g., FTP (file transfer protocol), TFTP (trivial file transfer protocol), HTTP (hypertext transfer protocol), etc.). As another example, the notification may inform the other CPE devices 110 that the identified CPE device 110 will deliver the download to the other CPE devices 110 utilizing the same or a similar download protocol that was used by the identified CPE device 110 in receiving the download (e.g., GIL (gateway image loader), DCT, etc.).

At 430, the download may be delivered to each of the other devices. The download may be delivered to the other devices, for example, from the identified device (e.g., a download module 215 of the identified CPE device 110). In embodiments, the download may be pushed to each respective one of the other devices at a time when the respective device is free or relatively less busy or when a tuner becomes available at the respective device. The download may be delivered to each respective one of the other devices in response to the identified device receiving a request for the download from the respective device.

In embodiments, the identified CPE device 110 may output a report that includes an acknowledgement of a successful retrieval of the download by the identified CPE device 110 as well as an acknowledgement of a successful retrieval of the download by each of the one or more other CPE devices 110. The report may be output, for example, to the download server 125 of FIG. 1 or other application or server within an associated MSO (multiple systems operator) network.

Figure 5:
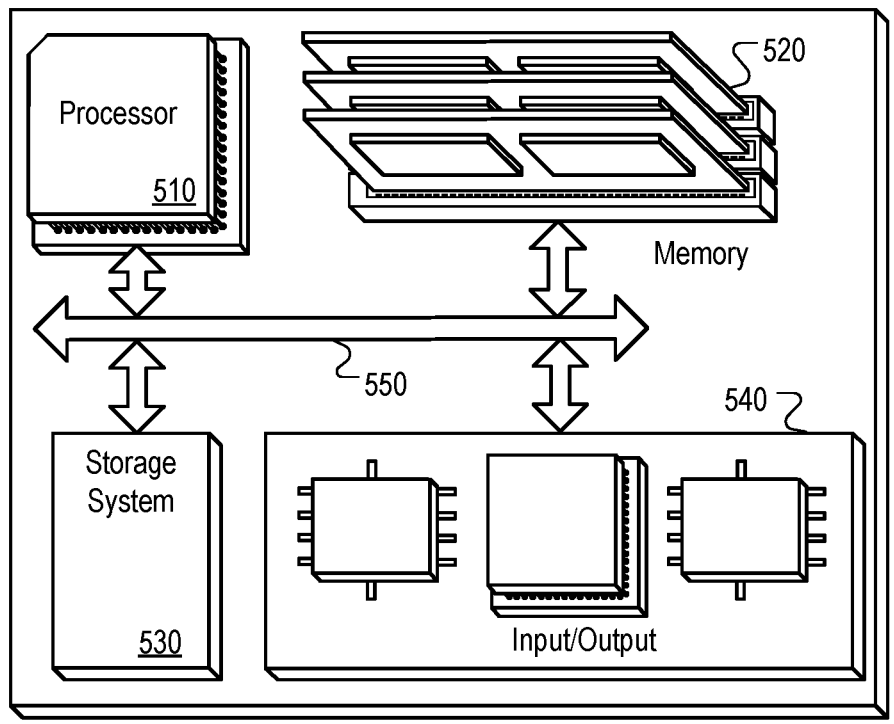
FIG. 5 is a block diagram of a hardware configuration operable to facilitate a selection of a device for receiving a download associated with one or more other devices.

FIG. 5 is a block diagram of a hardware configuration 500 operable to facilitate a selection of a device for receiving a download associated with one or more other devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, data, and/or other services to an access device 105 of FIG. 1 or a CPE device 110 of FIG. 1 (e.g., television, computer, tablet, mobile device, multimedia gateway device, STB, access point, etc.). In embodiments, the input/output device can include driver devices configured to send communications to, and receive communications from one or more networks (e.g., access network 115 of FIG. 1, WAN 120 of FIG. 1, etc.) or upstream server (e.g., download server 125 of FIG. 1).

Those skilled in the art will appreciate that the invention improves upon methods and systems for delivering downloads to multiple devices within a subscriber premise. Methods, systems, and computer readable media can be operable to facilitate a selection of a device for receiving a download associated with one or more other devices. When a download is targeted to a plurality of devices, an individual device may be selected from the plurality of devices, and the selected device may retrieve the download. After retrieving the download, the selected device may share the download with the rest of the plurality of devices. The individual device may be selected based upon status information associated with each of the plurality of devices, and the selected device may be a device that is free or relatively less busy than the other devices.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:

receiving download trigger information associated with a download targeted for a plurality of devices;

retrieving status information associated with each respective one device of the plurality of devices;

based upon the retrieved status information, selecting a device to receive the download targeted for the plurality of devices, wherein the selected device is selected from the plurality of devices;

receiving the download at the selected device;

outputting a notification to the other devices of the plurality of devices, wherein the notification comprises instructions for retrieving the download; and when the selected device is selected, outputting a notification to the other devices of the plurality of devices, wherein the notification comprises an instruction for the other devices to forego a retrieval of the download from an upstream server.

2. The method of claim 1, further comprising:

outputting the download from the selected device to each respective one device of the other devices of the plurality of devices.

3. The method of claim 1, wherein selecting a device to receive the download targeted for the plurality of devices comprises:

based upon the retrieved status information, identifying a device from the plurality of devices that has the most available resources relative to the other devices; and selecting the identified device to receive the download.

4. The method of claim 1, wherein the download comprises an in-band download, and wherein selecting a device to receive the download targeted for the plurality of devices comprises:

based upon the retrieved status information, identifying a device from the plurality of devices that has a free tuner; and selecting the identified device to receive the download.

5. The method of claim 1, further comprising:

outputting an acknowledgment to an upstream server when a respective device of the other devices of the plurality of devices successfully receives the download from the selected device.

6. The method of claim 1, wherein the status information associated with each respective one device of the plurality of devices comprises a measure of resources of the respective one device that are available for utilization in a retrieval of the download.

7. A customer premise equipment device that:

receives download trigger information associated with a download targeted for a plurality of devices;

retrieves status information associated with each respective one device of the plurality of devices;

based upon the retrieved status information, selects a device to receive the download targeted for the plurality of devices, wherein the selected device is selected from the plurality of devices;

receives the download at the selected device;

outputs a notification to the other devices of the plurality of devices, wherein the notification comprises instructions for retrieving the download; and when the selected device is selected, outputs a notification to the other devices of the plurality of devices, wherein the notification comprises an instruction for the other devices to forego a retrieval of the download from an upstream server.

8. The customer premise equipment device of claim 7, wherein the customer premise equipment device further:

outputs the download from the selected device to each respective one device of the other devices of the plurality of devices.

9. The customer premise equipment device of claim 7, wherein selecting a device to receive the download targeted for the plurality of devices comprises:

based upon the retrieved status information, identifying a device from the plurality of devices that has the most available resources relative to the other devices; and selecting the identified device to receive the download.

10. The customer premise equipment device of claim 7, wherein the download comprises an in-band download, and wherein selecting a device to receive the download targeted for the plurality of devices comprises:

based upon the retrieved status information, identifying a device from the plurality of devices that has a free tuner; and selecting the identified device to receive the download.

11. The customer premise equipment device of claim 7, wherein the customer premise equipment device further:

outputs an acknowledgment to an upstream server when a respective device of the other devices of the plurality of devices successfully receives the download from the selected device.

12. One or more non-transitory computer readable media having instructions operable to cause one or more processors to perform the operations comprising:

receiving download trigger information associated with a download targeted for a plurality of devices;

retrieving status information associated with each respective one device of the plurality of devices;

based upon the retrieved status information, selecting a device to receive the download targeted for the plurality of devices, wherein the selected device is selected from the plurality of devices;

receiving the download at the selected device;

outputting a notification to the other devices of the plurality of devices, wherein the notification comprises instructions for retrieving the download; and when the selected device is selected, outputting a notification to the other devices of the plurality of devices, wherein the notification comprises an instruction for the other devices to forego a retrieval of the download from an upstream server.

13. The one or more non-transitory computer readable media of claim 12, wherein the instructions are further operable to cause the one or more processors to perform the operations comprising:

outputting the download from the selected device to each respective one device of the other devices of the plurality of devices.

14. The one or more non-transitory computer readable media of claim 12, wherein selecting a device to receive the download targeted for the plurality of devices comprises:

based upon the retrieved status information, identifying a device from the plurality of devices that has the most available resources relative to the other devices; and selecting the identified device to receive the download.

15. The one or more non-transitory computer readable media of claim 12, wherein the download comprises an in-band download, and wherein selecting a device to receive the download targeted for the plurality of devices comprises:

based upon the retrieved status information, identifying a device from the plurality of devices that has a free tuner; and selecting the identified device to receive the download.

16. The one or more non-transitory computer readable media of claim 12, wherein the instructions are further operable to cause the one or more processors to perform the operations comprising:
  outputting an acknowledgment to an upstream server when a respective device of the other devices of the plurality of devices successfully receives the download from the selected device.

17. The one or more non-transitory computer readable media of claim 12, wherein the status information associated with each respective one device of the plurality of devices comprises a measure of resources of the respective one device that are available for utilization in a retrieval of the download.

* * * * *